United States Patent [19]
LaVeine et al.

[11] Patent Number: 5,944,170
[45] Date of Patent: Aug. 31, 1999

[54] STROKE CONTROL SYSTEM FOR A VIBRATORY CONVEYOR

[76] Inventors: Andrew T. LaVeine, 9965 Trillium La., Newberg, Oreg. 97258-2007; Stanley L. Humiston, 8438 S.W. 166th Terrace, Beaverton, Oreg. 97007

[21] Appl. No.: 08/846,880

[22] Filed: May 1, 1997

[51] Int. Cl.[6] .................................................. B65G 27/32
[52] U.S. Cl. ........................ 198/762; 198/764; 198/751
[58] Field of Search .................................. 198/762, 764, 198/766, 761, 751

[56] References Cited

U.S. PATENT DOCUMENTS

| | | | |
|---|---|---|---|
| 2,664,995 | 1/1954 | Renner | 198/766 |
| 2,675,907 | 4/1954 | Becker | 198/761 |
| 3,049,223 | 8/1962 | Westerman | 198/766 |
| 3,236,381 | 2/1966 | Poyntier | 198/761 |
| 3,581,871 | 6/1971 | Forman | 198/764 |
| 3,716,130 | 2/1973 | Morris | 198/762 |
| 4,088,223 | 5/1978 | Bertrand | 198/766 |
| 4,168,744 | 9/1979 | Musschoot | 198/762 |
| 4,216,416 | 8/1980 | Grace | 198/762 |
| 4,508,208 | 4/1985 | Preedy | 198/751 |
| 5,054,606 | 10/1991 | Musschoot | 198/762 |
| 5,158,170 | 10/1992 | Grengg et al. | 198/762 |

FOREIGN PATENT DOCUMENTS

| | | | |
|---|---|---|---|
| 485982 | 12/1920 | Germany | 198/764 |
| 244810 | 10/1987 | Japan | 198/762 |
| 47216 | 2/1988 | Japan | 198/762 |
| 123457 | 3/1959 | U.S.S.R. | 198/764 |
| 1093650 | 5/1984 | U.S.S.R. | 198/762 |

*Primary Examiner*—William E. Terrell
*Assistant Examiner*—Khoi H. Tran
*Attorney, Agent, or Firm*—Chernoff, Vilhauer, McClung & Stenzel LLP

[57] ABSTRACT

The present invention provides a stroke control system for a vibratory conveyor which has a vibrating trough driven by a variable frequency motor. The stroke control system includes a transducer connected to the vibrating trough for sensing a vibration amplitude and for providing an output signal in response thereto. A motor control circuit is responsive to the transducer output signal for reducing the frequency of the motor when the output exceeds some threshold value.

8 Claims, 3 Drawing Sheets

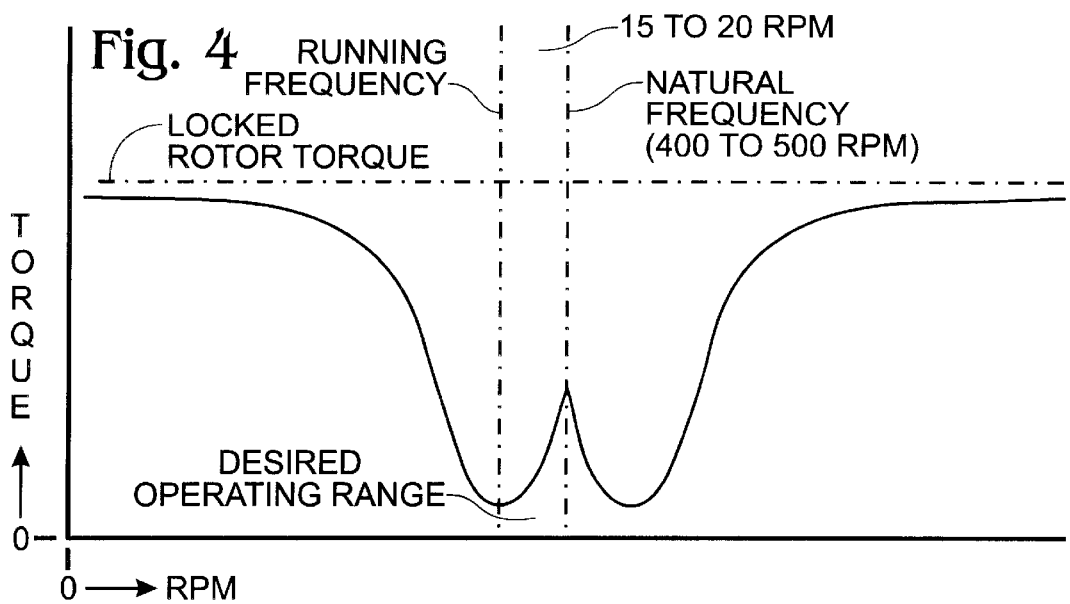
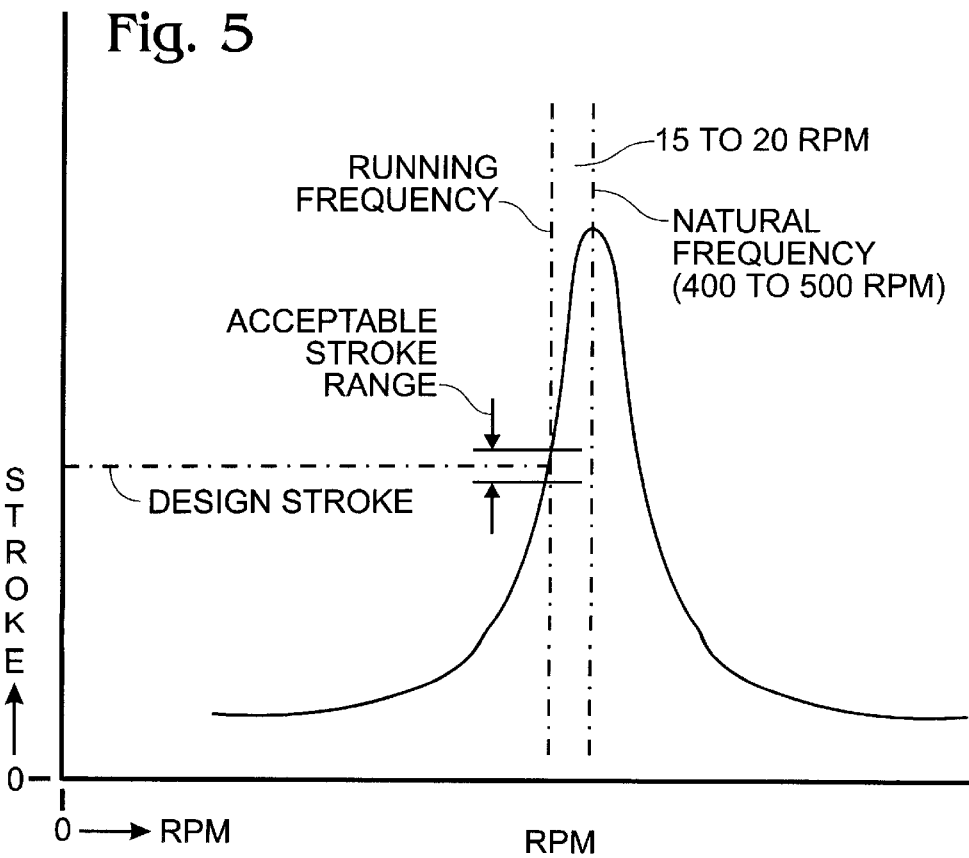

5,944,170

STROKE CONTROL SYSTEM FOR A VIBRATORY CONVEYOR

BACKGROUND OF THE INVENTION

Vibratory conveyors are frequently constructed to operate at a tuned natural frequency. These types of conveyors are driven by a motor and some type of soft-spring connection between the drive motor and a vibrating trough. Unfortunately, such systems have a tendency to overdrive and vibrate at a higher amplitude than intended by the designer. This high amplitude displacement or "over-stroke" can be the result of unexpected changes in vibrating weight, driven speed or the spring rate of the reactor or drive springs and can cause structural and component damage to the equipment and surrounding structures.

SUMMARY OF THE INVENTION

The present invention provides a stroke control system for a vibratory conveyor which has a vibrating trough driven by a variable frequency motor. The stroke control system includes a transducer connected to the vibrating trough for sensing a vibration amplitude and for providing an output signal in response thereto. A motor control circuit is responsive to the transducer output signal for reducing the frequency of the motor when the output exceeds some threshold value.

The vibratory conveyer is usually driven by a push rod mounted to an eccentric. A drive spring is interconnected between the push rod mounted to the eccentric and the vibratory conveyor. The vibrating conveyor itself rests on reactor springs which allow the trough to vibrate under the action of the push rod and drive spring combination.

The transducer is an angular displacement transducer coupled to the vibrating trough through a pivotable link. The transducer senses the vibration amplitude of the vibrating trough and provides an output signal in response thereto. The output of the transducer is an AC signal since the transducer includes a reciprocating lever whose excursions are in both the positive and negative position about a center axis. The output of the transducer is thereafter rectified and filtered to provide a slowly varying DC signal. This DC signal provides a motor control signal to an inverter motor controller. The motor controller compares the DC output signal with a set point value, and if the rectified DC signal rises above the set point, the invertor motor controller varies the frequency of the motor in proportion to the amount by which the DC signal exceeds the set point.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 4 is a graph illustrating torque as a function of RPM of the vibratory conveyor of FIG. 1.

FIG. 5 is a graph illustrating stroke length as a function of RPM of the vibratory conveyor of FIG. 1.

DETAILED DESCRIPTION OF THE PREFERRED EMBODIMENT

Figure 1:
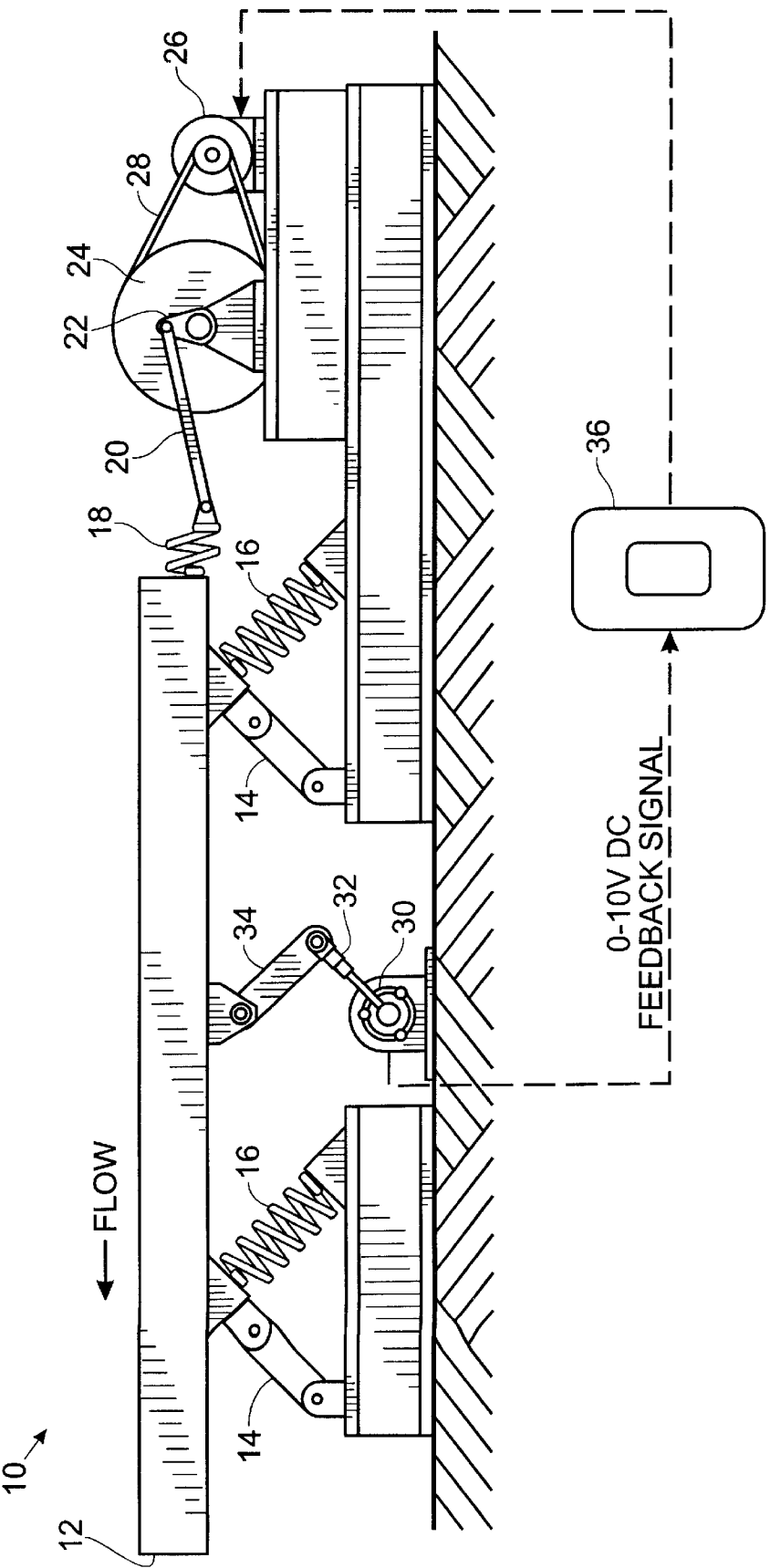
FIG. 1 is a side elevation view of a stroke control system employing the present invention.
Figure 2:
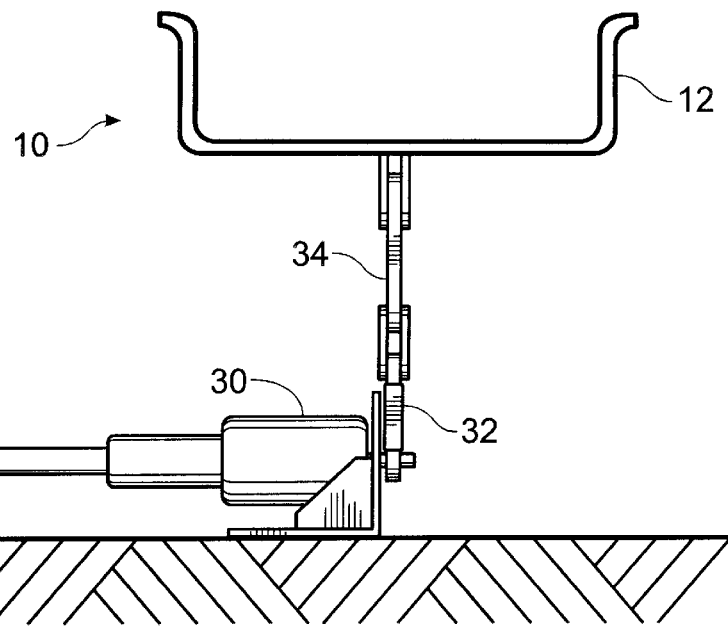
FIG. 2 is an end view of the stroke control system of FIG. 1.

A vibratory conveyor system 10 includes a vibrating trough 12 which is supported on rocker legs 14 and reactor springs 16. The trough 12 is vibrated through the action of a drive spring 18 coupled to a connecting push rod 20. The connecting rod 20 is coupled to an eccentric shaft 22 which is journaled through a flywheel 24. The flywheel 24 is coupled to a drive motor 26 by way of a drive belt 28. An angular displacement transducer 30 has a transducer lever 32 coupled to the vibratory trough 12 through a trough link 34.

The trough 12 moves reciprocally in the direction indicated by the "trough motion" arrow in FIG. 1. At the same time material (not shown) moves in the direction of the flow line of FIG. 1. As the trough vibrates, the transducer lever 32 moves back-and-forth in an arc as indicated by the arrows in FIG. 1. This produces an electrical signal which provides a feedback control for an inverter motor controller 36. The inverter motor controller 36 includes a set point and when the feedback signal varies from the set point, the inverter 36 makes an adjustment in the speed of the drive motor 26.

Figure 3:
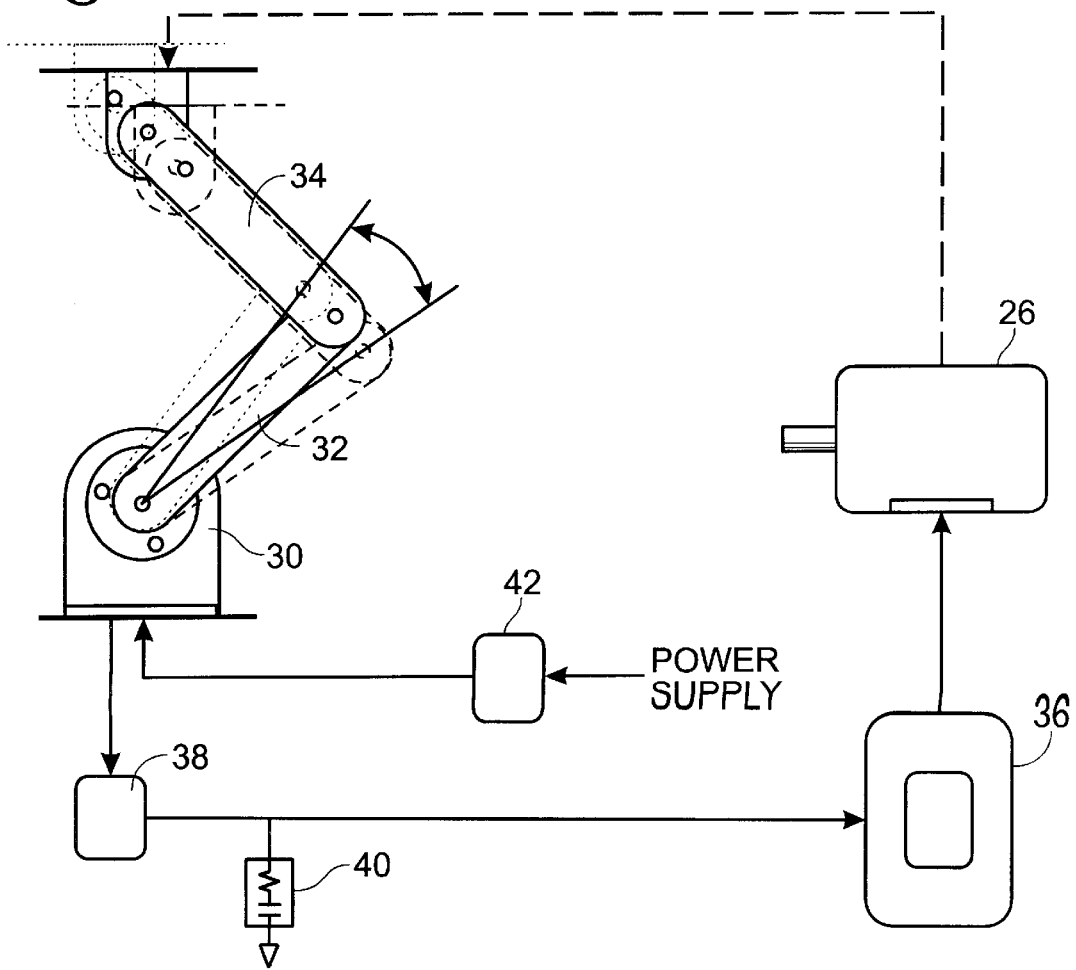
FIG. 3 is an electrical block schematic diagram of the stroke control system of FIG. 1.

An electrical schematic diagram is shown in FIG. 3. The transducer lever 32 has a range of motion as indicated by the curved arrow of FIG. 3. This back-and-forth motion, which tracks the vibration of the vibrating trough, produces an AC signal about a zero axis. The AC signal is fed to a rectifier 38. The rectified signal is smoothed in a low pass filter 40 to provide a slowly varying DC feedback signal. The inverter motor 36 has a set point and the DC feedback signal is compared with the set point. The difference between the DC feedback signal and the set point becomes a proportional motor control error signal. The drive motor 26 is a variable frequency motor and whenever the frequency control signal from the inverter 36 varies from its nominal value, the drive motor frequency changes according to the value of the error signal.

Thus, if the vibratory trough begins to vibrate closer to its natural frequency range as shown in FIG. 4, the stroke increases as shown in FIG. 5. Since it is desirable to operate at a stroke range which is 15–20 rpms below the natural frequency the error signal effectively damps the overstroke by slowing down the motor. Similarly, if due to a condition in which the trough is overloaded and the stroke needs to be increased, the motor 26 can be commanded to increase its speed accordingly so as to lie within the acceptable stroke range indicated in FIG. 5.

Thus, the closed feedback loop formed by the transducer 30, the rectifier and filter 38 and 40, the inverter 36 and the motor 26 provides a constant amplitude of trough motion regardless of changes to vibrating weight, spring weight of reactor springs or drive springs. The speed of the drive motor will vary as required by this loop to maintain the trough motion as preset by the operator.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. In a vibratory conveyor having a vibrating trough, said trough having an amplitude of vibration, the combination comprising:

a) a variable frequency motor having a mechanical output member coupling said motor with said trough;

b) a stroke control system for regulating the frequency of the variable frequency motor said stroke control system including a mechanical link coupled between the vibrating trough and a mechanical displacement transducer, said mechanical displacement transducer providing an output signal proportional to the amplitude of vibration of said vibrating trough, and c) a motor control circuit responsive to said output signal said motor control circuit providing a motor control signal to vary the frequency of said variable frequency motor.

2. The combination of claim 1 wherein said mechanical output link is a push rod coupled to said vibrating trough by a drive spring .

3. The combination of claim 1 wherein said mechanical displacement transducer is an angular displacement transducer and wherein said mechanical link is a pivotable arm extending between said vibrating trough and said mechanical displacement transducer.

4. The combination of claim 1 wherein said motor control circuit includes a set point value to cause said vibrating trough to vibrate at a frequency that is just below a natural vibratory frequency of said vibrating trough.

5. In a vibratory conveyor having a vibrating trough, said trough having an amplitude of vibration, the combination comprising:

a) a variable frequency motor having a reciprocating output member said output member being coupled to said vibrating trough and including a spring member interacting between said output member and said trough; and b) a stroke control system for regulating the frequency of said variable frequency motor said stroke control system including an angular displacement transducer having a transducer lever coupled to said vibrating trough by a link, said angular displacement transducer being responsive to said amplitude of vibration of said vibrating trough whereby the frequency of said variable frequency motor is reduced when said amplitude of vibration rises above a predetermined value.

6. The vibratory conveyor of claim 5 wherein said vibrating trough has an amplitude of vibration having a natural resonant frequency of vibration and said angular displacement transducer provides an output signal, the combination further comprising a control circuit responsive to said output signal, said control circuit having a predetermined set point selected to limit the frequency of said variable frequency motor such that said vibrating trough vibrates at a control frequency just below said natural resonant frequency.

7. The combination of claim 5 wherein said mechanical link is a pivotable arm extending between said vibrating trough and said mechanical displacement transducer.

8. The combination of claim 5 further including a motor control circuit responsive to an output signal produced by said angular displacement transducer wherein said output signal is a function of the amplitude of vibration of said vibrating trough.

* * * * *